(Model.)

2 Sheets—Sheet 1.

J. D. CROCKETT.
MUZZLE.

No. 272,214.

Patented Feb. 13, 1883.

Witnesses.
Louis F. Gardner
E. D. York

Inventor.
J. D. Crockett,
per
F. A. Lehmann,
Atty.

(Model.)

2 Sheets—Sheet 2.

J. D. CROCKETT.
MUZZLE.

No. 272,214. Patented Feb. 13, 1883.

Witnesses.
Louis F. Gardner
E. D. York

Inventor.
J. D. Crockett,
per
F. A. Lehmann,
atty.

UNITED STATES PATENT OFFICE.

JAMES D. CROCKETT, OF RIPLEY, MISSISSIPPI.

MUZZLE.

SPECIFICATION forming part of Letters Patent No. 272,214, dated February 13, 1883.

Application filed October 30, 1882. (Model.)

*To all whom it may concern:*

Be it known that I, J. D. CROCKETT, of Ripley, in the county of Tippah and State of Mississippi, have invented certain new and useful Improvements in Muzzles; and I do hereby declare the following to be a full, clear, and exact description of the invention, such as will enable others skilled in the art to which it pertains to make and use it, reference being had to the accompanying drawings, which form part of this specification.

My invention relates to an improvement in muzzles; and it consists in the combination of a muzzle having two hinged parts and an operating-lever for opening the parts outward, the lever being provided with a barb for pricking the animal when it attempts to suck or to throw off the rails of a fence.

It still further consists in attaching to the muzzle a blind, which is to be connected to the operating-lever in such a manner that when the lower end of the lever comes in contact with the ground, so as to open the hinged parts of the muzzle, the blind will be raised upward a short distance, so as to give the animal a better view of the ground immediately around it, and then, when the animal raises its head, the blind drops back into position, as will be more fully described hereinafter.

The object of my invention is to provide a muzzle which is specially adapted for breaking colts and calves from sucking, but which can also be used upon larger stock for the purpose of preventing them from straying too far away and to keep them from throwing off top rails of the fence.

Figure 1:
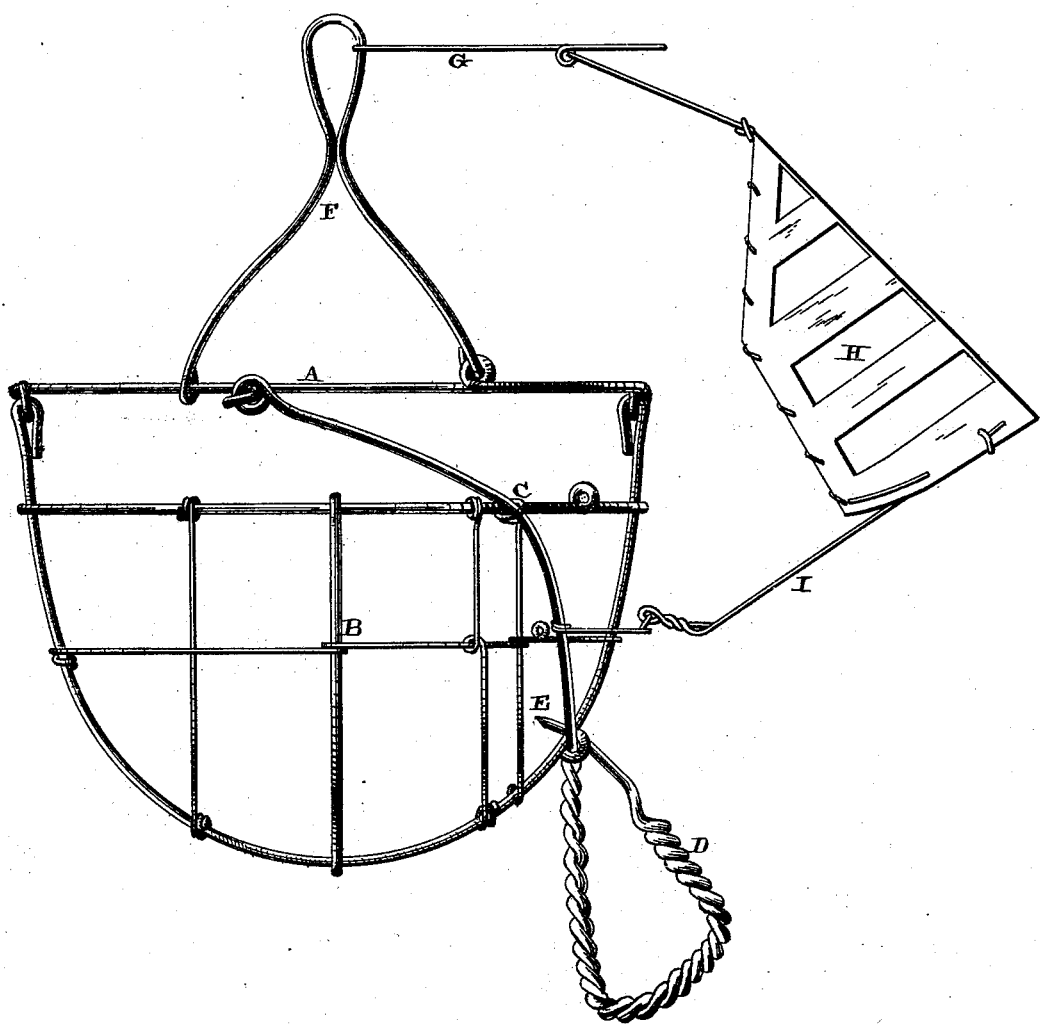
Figure 2:
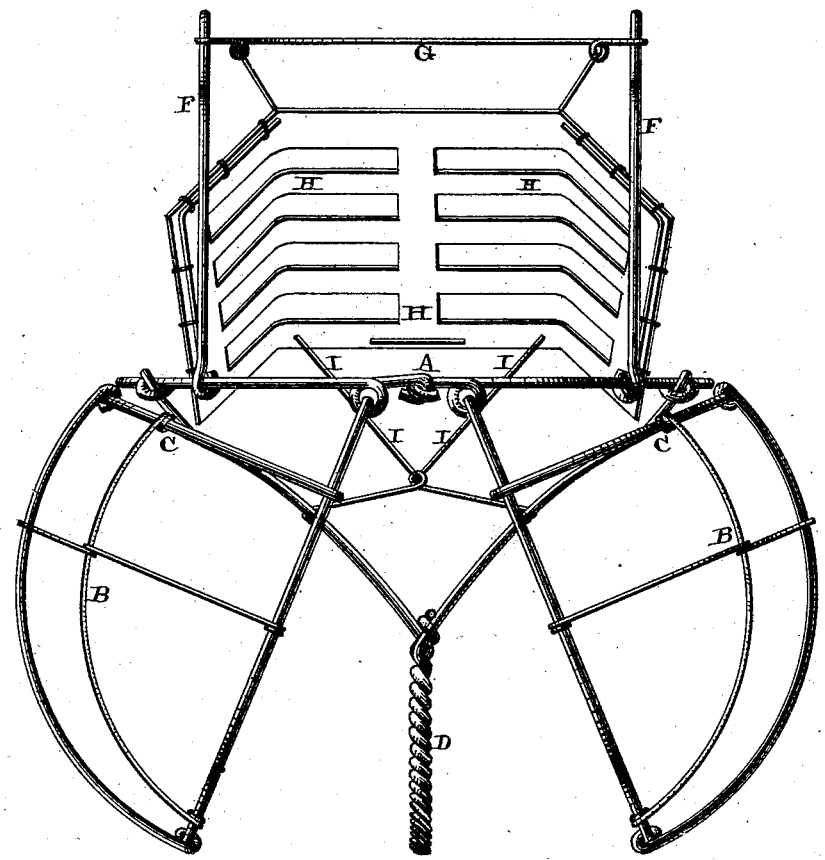

Figure 1 is a side elevation of my invention complete. Fig. 2 is a front view of the same, showing the muzzle opened outward.

This invention is intended as an improvement upon the patent granted to me July 11, 1882. So far as the muzzle itself is concerned, having the two pivoted portions, which open outward, and an operating-lever for opening them, the muzzle is substantially the same. In this case the operating-lever is pivoted at its upper end to the band A, which passes around the animal's nose or lower part of the head, and is connected to the upper edges of the hinged portions B at C. The pivoted lever D extends down below the bottom of the muzzle, so as to come in contact with the ground or receptacle out of which the animal is eating, and thus open the hinged portions, so as to allow the animal to freely eat. Secured to this operating-lever, at any suitable point, is a sharp barb, E, which, when the animal throws its head upward, either for the purpose of sucking or for the purpose of throwing rails off the fence, will prick the animal upon the front of the nose in such a way as to cause it to desist.

Attached to those portions F of the muzzle which extend up along the sides of the head is the supporting-frame G, to which the blind H is attached. This blind may be either solid or slotted, as shown here, and is intended to come just over the front of the animal's eyes, so as to prevent it from straying too freely, and also to prevent it from throwing off the top rails of fences for the purpose of jumping. This blind is attached at its lower end to the operating-lever D, by means of the connecting wires or rods I, so that when the lever is raised upward the blind will also be raised at the same time, so as to allow the animal to obtain a better and clearer view of the ground immediately around it. As soon as the animal raises its head the weight of the two operating parts causes the lever to drop downward, and as the lever drops downward the blind is again pulled down over the animal's eyes.

This muzzle is specially adapted for weaning colts and calves; but it is also equally adapted for other animals which are inclined to jump fences or to throw the rails off the fence.

Having thus described my invention, I claim—

1. A muzzle having the two hinged portions, combined with the operating-lever provided with a barb, substantially as shown.

2. A muzzle having the two hinged parts and the operating-lever, the operating-lever being pivoted to the band or ring which encircles the lower part of the animal's head and connected to the upper edge of the hinged parts, substantially as described.

3. The combination of a muzzle having the two pivoted parts and the pivoted operating-lever, with a blind, which is connected both to the muzzle and to the operating-lever, substantially as set forth.

In testimony whereof I affix my signature in presence of two witnesses.

JAMES DAVIS CROCKETT.

Witnesses:
  W. F. GOWEN,
  R. H. CLEEVE.